United States Patent
White et al.

(10) Patent No.: US 7,974,308 B2
(45) Date of Patent: Jul. 5, 2011

(54) INTERWORKING CIRCUIT EMULATION SERVICE OVER PACKET AND IP/MPLS PACKET PROCESSING

(75) Inventors: Tim White, Ottawa (CA); Aaron Maxwell MacDonald, Ottawa (CA); Dion Pike, Stittsville (CA)

(73) Assignee: Alcatel Lucent, Paris (FR)

( * ) Notice: Subject to any disclaimer, the term of this patent is extended or adjusted under 35 U.S.C. 154(b) by 1102 days.

(21) Appl. No.: 11/234,167

(22) Filed: Sep. 26, 2005

(65) Prior Publication Data

US 2007/0071029 A1 Mar. 29, 2007

(51) Int. Cl.
*H04J 3/16* (2006.01)
*H04L 12/28* (2006.01)

(52) U.S. Cl. ........ 370/466; 370/389; 370/392; 370/474; 370/352; 455/238.1

(58) Field of Classification Search .................. 370/466, 370/400, 395.5, 352, 389, 474, 467, 469, 370/392, 394, 506, 521, 395.52, 217; 455/238, 455/238.1
See application file for complete search history.

(56) References Cited

U.S. PATENT DOCUMENTS

| | | | | |
|---|---|---|---|---|
| 6,731,649 B1* | 5/2004 | Silverman | | 370/466 |
| 7,082,140 B1* | 7/2006 | Hass | | 370/466 |
| 7,120,151 B1* | 10/2006 | Ginjpalli et al. | | 370/395.1 |
| 2003/0012188 A1* | 1/2003 | Zelig et al. | | 370/389 |
| 2003/0118019 A1* | 6/2003 | Mark et al. | | 370/392 |
| 2005/0169270 A1* | 8/2005 | Mutou et al. | | 370/390 |
| 2006/0209886 A1* | 9/2006 | Silberman et al. | | 370/466 |

FOREIGN PATENT DOCUMENTS

| | | |
|---|---|---|
| EP | 1187406 A1 | 3/2002 |
| WO | WO 2003/003667 | 1/2003 |
| WO | WO 2005/055548 | 6/2005 |

OTHER PUBLICATIONS

Malis et al., SONET/SDH Circuit Emulation Service Over MPLS (CEM) Encapsulation, Apr. 2001, Internet Engineering Task Force, pp. 1-5.*
Martini et al., Encapsulation Methods for Transport of Layer 2 Frames Over MPLS, Feb. 2001, Internet Engineering Task Force, pp. 1-13.*
Martini et al., Transport of Layer 2 Frames Over MPLS, Feb. 2001, Internet Engineering Task Force, pp. 1-10.*
Delivery of Broadcast TV over a VPLS-Based Multicast Solution, Dec. 2, 2004, Internet Citation (Online) Alcatel, XP001237249.

* cited by examiner

*Primary Examiner* — Aung S Moe
*Assistant Examiner* — Jamal Javaid
(74) *Attorney, Agent, or Firm* — Kramer & Amado P.C.

(57) ABSTRACT

A system and method are provided for implementing CESOP inexpensively yet effectively implemented across an MPLS or an IP network. A Zarlink chip provides CESOP functionality, providing a TDM pseudowire by converting TDM streams into Ethernet packets. These Ethernet packets can be processed by a Marvell chip, which has the ability to perform QoS functions on the packets. The Marvell chip converts the Ethernet packets into MPLS or IP packets for transmission over a packet network. Use of a single virtual circuit label, invisible to the packet network for routing purposes, within the Ethernet packet allows Marvell chips at each end of the emulated circuit to tie traffic to a particular customer and to thereby apply appropriate QoS constraints.

20 Claims, 3 Drawing Sheets

INTERWORKING CIRCUIT EMULATION SERVICE OVER PACKET AND IP/MPLS PACKET PROCESSING

FIELD OF THE INVENTION

The invention relates to CESoP communications, and more particularly to mapping packet traffic to customers within such communications.

BACKGROUND OF THE INVENTION

In order to reduce transport costs, operators of legacy TDM networks may wish to transport TDM traffic over IP/MPLS core networks. Circuit Emulation Service over Packet (CESOP) Pseudowire (PW) allows such operators to do so. A Circuit Emulation Service (CES) device is used as an edge device between the legacy network and the IP/MPLS network. The CES device accepts synchronized cells, such as over a T1 line in TDMA format, encapsulates and packetizes the data, and sends the packets over a packet network such as an IP/MPLS network. At the far end of the packet network, another CES device converts the packet data back into synchronized data for recognition and transmission through the synchronized data network.

Zarlink™ produces a CES device, the Zarlink ZL50110/1/4 chip ("the Zarlink chip"). The Zarlink chip converts synchronized data to packet data. However, the encapsulation is only to layer 2 and is very basic, because CESoP processing is very processor intensive. The Zarlink chip provides no quality of service (QoS) monitoring, buffering, or customer billing.

Marvell™ produces an IP/MPLS packet processor, the Marvell MX-610/5 IP/MPLS chip ("the Marvell chip"). The Marvell chip is designed to tie packets to a customer, and thereby provide QoS monitoring, billing, buffering, and other customer specific features to packet traffic. However, the Marvell chip acts on Ethernet traffic or IP/MPLS traffic. If the Marvell chip receives a CESoP packet, it will discard the packet as junk.

A method of combining packet processing with packet-to-synchronized conversion would allow operators of legacy synchronized networks, such as TDM networks, to carry traffic over packet networks using CESoP while still tying traffic to customers, allowing the operator to offer customer-specific features.

SUMMARY OF THE INVENTION

In accordance with one aspect of the invention, a method is provided for providing CESoP service over a MPLS network. TDM data is received from a customer. The TDM data and a virtual circuit (VC) label are encapsulated into an Ethernet packet, the VC label identifying the customer. A packet processor receives the Ethernet packet, de-encapsulates the Ethernet packet, and encapsulates the TDM data and VC label into an MPLS packet by adding an MPLS tunnel label while preserving the VC label. The MPLS packet is then transmitted into the MPLS network. Prior to transmission into the MPLS network, the packet processor may associate the MPLS packet with the customer using the VC label, and apply QoS constraints associated with the customer to the MPLS packet.

In accordance with another aspect of the invention, a CES device is provided. The CES device includes a CES processor for converting TDM data from a customer into an Ethernet packet and adapted to insert a VC label into the Ethernet packet, the VC label being associated with the customer. The CES device also includes a packet processor for receiving the Ethernet packet, for retrieving the TDM data and the VC label, and for encapsulating the TDM data and the VC label within an MPLS packet while preserving the VC label.

The method of the invention may also be applied to CES over an IP network, and the CES device may be adapted for use with CESoP over an IP network.

The methods and apparatus of the present invention allow CESoP to be inexpensively yet effectively implemented across an MPLS or an IP network. The Zarlink chip provides CESoP functionality, providing a TDM pseudowire by converting TDM streams into Ethernet packets. These Ethernet packets can be processed by the Marvell chip, which has the ability to perform QoS functions on the packets. The Marvell chip converts the Ethernet packets into MPLS or IP packets for transmission over a packet network. Use of a single virtual circuit label, invisible to the packet network for routing purposes, within the Ethernet packet allows Marvell chips at each end of the emulated circuit to tie traffic to a particular customer and to thereby apply appropriate QoS constraints.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
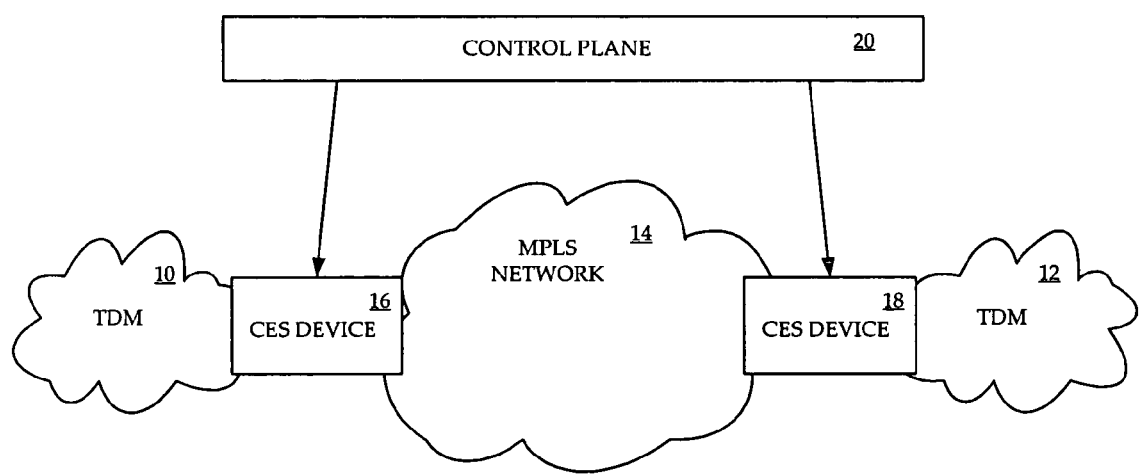
FIG. 1 is a diagram of an example communication network employing CESoP.

Referring to FIG. 1, a diagram of an example communication network employing Circuit Emulation Service over Packet (CESOP) is shown. CESoP allows a user of a first Time Division Multiplexing (TDM) network 10 to communicate with a second TDM network 12 via a Multiprotocol Label Switching (MPLS) network 14. The first TDM network 10 communicates with the MPLS network 14 through a first Circuit Emulation Service (CES) device 16, and the second TDM network 12 communicates with the MPLS network 14 through a second CES device 18. Each CES device behaves the same way, and the description given herein of the first CES device 16 applies equally to the second CES device 18. A control plane 20 is in communication with components within the TDM networks and with the CES devices.

Figure 2:
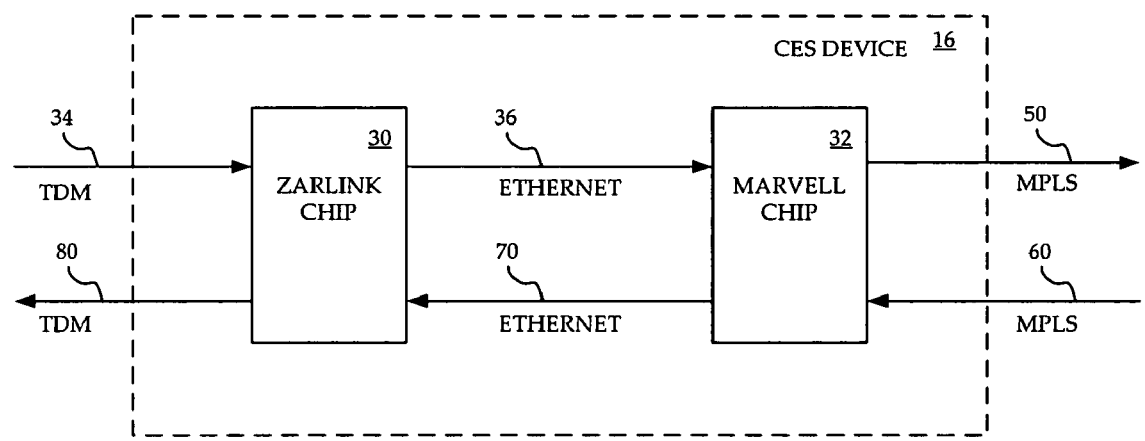
FIG. 2 is a diagram of the CES device of FIG. 1 according to one embodiment of the invention.

Referring to FIG. 2, details of the CES device 16 (or equivalently the CES device 18) of FIG. 1 are shown according to one embodiment of the invention. The CES device 16 includes a Zarlink™ ZL50110/1/4 processor ("the Zarlink chip") 30 and a Marvell™ MX-610/5 IP/MPLS processor ("the Marvell chip") 32. For outbound traffic, the Zarlink chip 30 receives a TDM stream 34 from the TDM network 10. The TDM stream 34 includes data and timing information. The Zarlink chip encapsulates the data and timing information from one or more TDM channels within the TDM stream 34 with MPLS information, and then encapsulates the resulting packet into an outgoing Ethernet packet 36.

Figure 3:
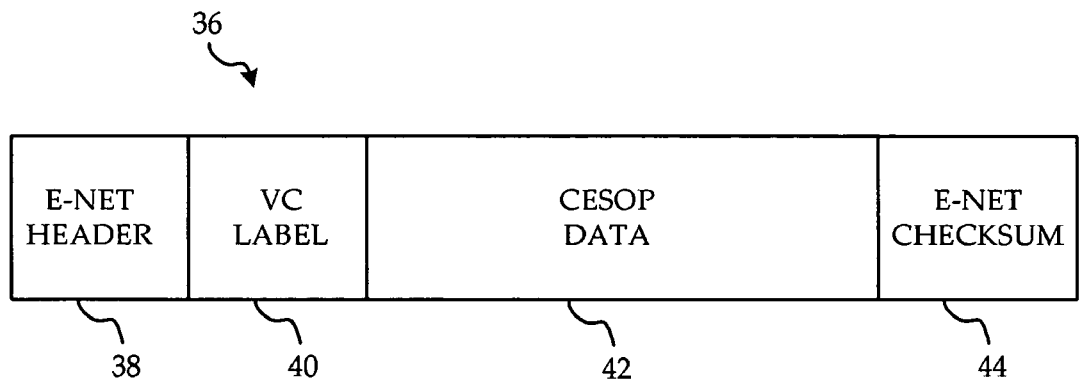
FIG. 3 is a diagram of the format of the outgoing Ethernet packet of FIG. 2 according to one embodiment of the invention.

Referring to FIG. 3, the format of the Ethernet packet 36 prepared by the Zarlink chip 30 is shown according to one embodiment of the invention. The outgoing Ethernet packet 36 includes an Ethernet header 38, an MPLS virtual channel (VC) label 40, the TDM data and timing information (referred to herein as CESOP data) 42, and an Ethernet checksum 44. The Zarlink chip 38 sets the Ethernet header 38 to a dummy value and calculates the Ethernet checksum 44, as the Ethernet header 38 will be ignored by the Marvell chip 32. The Zarlink chip 30 obtains the VC label 40 from the control plane. The control plane maintains a correspondence between customers and VC labels. In this way, each customer generating a TDM stream has an associated VC label, and this label is passed from the Zarlink chip 30 to the Marvell chip 32 as part of the Ethernet packet 36.

The Marvell chip 32 expects to receive an Ethernet encapsulated MPLS packet. The Marvell chip 32 receives the Ethernet packet 36 and removes the dummy values of the Ethernet header 38 and the Ethernet checksum 44. The Marvell chip 32 interprets the starting bytes of the remaining data as the VC label 40, since the Marvell chip 32 expects the de-encapsulated packet to be an MPLS packet. The Marvell chip 32 performs a label swap on the VC label 40 using a swap table stored on the Marvell chip 32. However, the swap table is populated such that the Marvell chip 32 swaps the VC label 40 for a label having the same value. In other words, each label within the swap table identifies a label having an identical value for swapping, so that the VC label after the label swap is the same as the VC label after the swap.

The Marvell chip 32 also applies Quality of Service (QoS) constraints and measures based on the VC label 40. Because the VC label is swapped for itself, the VC label remains tied to the customer originating the data within the TDM stream, and QoS functions can be applied on a per-customer basis.

Figure 4:
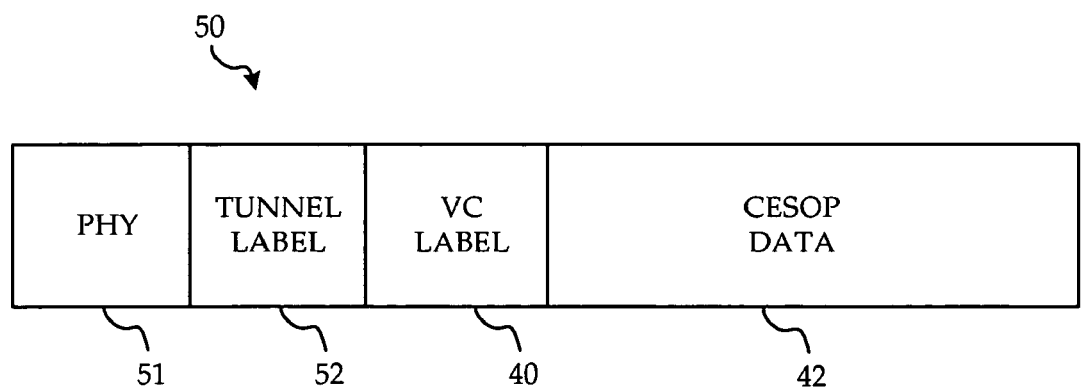
FIG. 4 is a diagram of the format of the outgoing MPLS packet of FIG. 2 according to one embodiment of the invention.

The Marvell chip 32 generates an outgoing MPLS packet, which is transmitted into the MPLS network 14. Referring to FIG. 4, the format of the outgoing MPLS packet 50 is shown according to one embodiment of the invention. The outgoing MPLS packet 50 includes an outer PHY encapsulation 51, an MPLS tunnel label 52, the VC label 40, and the CESOP 42. The PHY encapsulation 51 may be any encapsulation suitable for transport through the physical layer of the network 14, for example an Ethernet encapsulation. The MPLS tunnel label 52 is provided by the next router in the MPLS network 14. Once the outgoing MPLS packet 50 is transmitted to the MPLS network 14, all routers involved with routing the packet through the network consider only the MPLS tunnel label 52. The VC label 40 is ignored for routing purposes since it is effectively encapsulated within the outgoing MPLS packet 50. It is only seen by the receiving CES device 18, as will be described for incoming MPLS packets to the Marvell chip 32.

For inbound traffic, the Marvell chip 32 receives an incoming MPLS packet 60. The incoming MPLS packet 60 has the same format as that described for the outgoing MPLS packet 50, the incoming MPLS packet 60 having been generated and transmitted by another CES device. The incoming MPLS packet 60 will have a VC label 40 and CESOP data 42 generated by the Zarlink chip of the other CES device, and an MPLS tunnel label 52 generated routers in the network 14 as the incoming MPLS packet 60 traverses the MPLS network 14. The VC label 40 will generally have a different value than that of the outgoing MPLS packet, as the VC label of the incoming MPLS packet and the VC label of the outgoing MPLS packet are negotiated with the control plane independently. The VC label of the incoming MPLS packet is still tied to the customer, however. The Marvell chip 32 strips the MPLS tunnel label 52 from the incoming MPLS packet 60. The Marvell chip 32 performs a label swap on the VC label 40 but, as described above with reference to processing of the outgoing Ethernet packet 36, swaps the VC label 40 for itself so that the incoming MPLS packet 60 remains tied to a customer. The Marvell chip 32 performs QoS functions on the incoming MPLS packet 60 as are configured for the VC label 40.

The Marvell chip encapsulates the incoming MPLS packet 60 within an Ethernet packet by adding an Ethernet header and an Ethernet checksum, using a dummy value for the Ethernet header, to generate an incoming Ethernet packet 70. The incoming Ethernet packet 70 has the same format as described above with reference to the outgoing Ethernet packet 36. The Zarlink chip 30 receives the incoming Ethernet packet 70, removes the Ethernet header, VC label, and Ethernet checksum, and converts the CESOP data to an incoming TDM stream 80 for insertion into the TDM network 10.

The invention has been described with respect to circuit emulation over an MPLS network. The invention may also be applied over an IP network, with appropriate alterations to the Marvell chip configuration. Instead of encapsulating the VC label and the CESOP data with an MPLS tunnel label, the Marvell chip would encapsulate the VC label and the CESOP data within an IP packet. However, the Marvell chip must still swap the VC label 40 for a label having the same value, so that the traffic remains tied to a single VC label and hence to a single customer.

The embodiments presented are exemplary only and persons skilled in the art would appreciate that variations to the embodiments described above may be made without departing from the spirit of the invention. The scope of the invention is solely defined by the appended claims.

We claim:

1. A method of providing a Circuit Emulation Service over Packet (CESoP) service over a Multiprotocol Label Switching (MPLS) network, the method comprising:
   receiving Time Division Multiplexing (TDM) data from a customer;
   encapsulating the received TDM data and a virtual circuit (VC) label into an Ethernet packet, the VC label identifying the customer;
   transmitting the Ethernet packet into the MPLS network:
   receiving the Ethernet packet at a packet processor;
   in the packet processor, de-encapsulating the Ethernet packet;
   retrieving the TDM data and the VC label;
   encapsulating the TDM data and the VC label into a MPLS packet by adding an MPLS tunnel label while preserving the VC label; and
   associating the MPLS packet with the customer using the retrieved VC label so that traffic carried over the MPLS network using the CESoP service is tied to the customer.

2. The method of claim 1, further comprising:
   in the packet processor, applying Quality of Service (QoS) constraints to the MPLS packet, the QoS constraints being associated with the customer.

3. The method of claim 1, wherein encapsulating the received TDM data and the VC label into the Ethernet packet further comprises:
   encapsulating the received TDM data and the VC label into the Ethernet packet within a Circuit Emulation Service (CES) processor separate from the packet processor.

4. A method of providing a Circuit Emulation Service over Packet (CESoP) service over an Internet Protocol (IP) network, the method comprising:
    receiving Time Division Multiplexing (TDM) data from a customer;
    encapsulating the received TDM data and a virtual circuit (VC) label into an Ethernet packet, the VC label identifying the customer;
    transferring the Ethernet packet to a packet processor;
    in the packet processor, de-encapsulating the Ethernet packet to obtain the TDM data and VC label; and
    encapsulating the TDM data and the VC label into an IP packet while preserving the VC label; and
    associating the IP packet with the customer using the preserved VC label so that traffic using the CESoP service is tied to the customer.

5. The method of claim 4, further comprising:
    in the packet processor, applying Quality of Service (QoS) constraints to the IP packet, the QoS constraints being associated with the customer.

6. The method of claim 5, wherein encapsulating the received TDM data and the VC label into the Ethernet packet further comprises:
    encapsulating the received TDM data and the VC label into the Ethernet packet within a Circuit Emulation Service (CES) processor separate from the packet processor.

7. A Circuit Emulation Service (CES) device for converting Time Division Multiplexing (TDM) data from a customer into a Multiprotocol Label Switching (MPLS) packet, the device comprising:
    a CES processor that converts the TDM data from the customer into an Ethernet packet having a virtual channel (VC) label associated with the customer; and
    a packet processor that receives the Ethernet packet, retrieves the TDM data and the VC label from the received Ethernet packet, encapsulates the retrieved TDM data and the VC label within the Multiprotocol Label Switching (MPLS) packet, the encapsulating preserving the retrieved VC label, and associates the MPLS packet with the customer using the retrieved VC label.

8. The CES device of claim 7, wherein the CES processor is a Zarlink™ ZL50110/1/4 processor, and wherein the packet processor is a Marvell™ MX-610/5 processor.

9. The CES device of claim 7, wherein the packet processor preserves the retrieved VC label by swapping the VC label retrieved from the Ethernet packet for a second VC label having the same value.

10. A Circuit Emulation Service (CES) device for converting Time Division Multiplexing (TDM) data from a customer into an Internet Protocol (IP) packet, the device comprising:
    a CES processor that converts the TDM data from a customer into an Ethernet packet having a virtual channel (VC) label associated with the customer; and
    a packet processor that retrieves the TDM data and the VC label from the Ethernet packet and encapsulates the retrieved TDM data and the VC label within the Internet Protocol (IP) packet, the encapsulating preserving the retrieved VC label and associates the IP packet with the customer using the retrieved VC label.

11. The CES device of claim 10, wherein the CES processor is a Zarlink™ ZL50110/1/4 processor, and wherein the packet processor is a Marvell™ MX-610/5 processor.

12. The CES device of claim 10, wherein the packet processor preserves the VC label by swapping the VC label retrieved from the Ethernet packet for a second VC label having the same value.

13. The method of claim 1, wherein the Ethernet packet uses a single VC label that is invisible to the MPLS network for routing purposes.

14. The method of claim 4, wherein the Ethernet packet uses a single VC label that is invisible to the IP network for routing purposes.

15. The device of claim 7, wherein the Ethernet packet uses a single VC label that is invisible to a MPLS network for routing purposes.

16. The device of claim 10, wherein the Ethernet packet uses a single VC label that is invisible to an IP network for routing purposes.

17. The method of claim 1, wherein the VC label remains tied to the customer even when the VC label has a different value.

18. The method of claim 4, wherein the VC label remains tied to the customer even when the VC label has a different value.

19. The device of claim 7, wherein the VC label remains tied to the customer even when the VC label has a different value.

20. The device of claim 10, wherein the VC label remains tied to the customer even when the VC label has a different value.

* * * * *